(12) United States Patent (10) Patent No.: US 8,632,899 B2
Ro (45) Date of Patent: Jan. 21, 2014

(54) BATTERY PACK

(75) Inventor: Huntae Ro, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 379 days.

(21) Appl. No.: 13/070,372

(22) Filed: Mar. 23, 2011

(65) Prior Publication Data

US 2012/0064377 A1 Mar. 15, 2012

(30) Foreign Application Priority Data

Sep. 13, 2010 (KR) .................. 10-2010-0089411

(51) Int. Cl.
*H01M 2/00* (2006.01)

(52) U.S. Cl.
USPC ............................................. 429/7

(58) Field of Classification Search
None
See application file for complete search history.

(56) References Cited

U.S. PATENT DOCUMENTS

2007/0160878 A1* 7/2007 Kim et al. .......................... 429/7
2009/0072785 A1* 3/2009 Moon ............................. 320/112

FOREIGN PATENT DOCUMENTS

| JP | 2005-317460 (A) | | 11/2005 |
| JP | 2008-123758 | * | 5/2008 |
| JP | 2008-123758 (A) | | 5/2008 |
| JP | 2009-059663 (A) | | 3/2009 |
| KR | 10-0709884 (B1) | | 4/2007 |

OTHER PUBLICATIONS

Korean Notice of Allowance dated Dec. 20, 2011 for Korean Patent Application No. KR 10-2010-0089411 which corresponds to captioned U.S. Appl. No. 13/070,372.

* cited by examiner

*Primary Examiner* — Patrick Joseph Ryan
*Assistant Examiner* — Christopher Domone
(74) *Attorney, Agent, or Firm* — Knobbe Martens Olson & Bear LLP

(57) ABSTRACT

A battery pack is described. In one aspect it can securely connect a connecting tab extending from a protective circuit board and a sensing tab drawn out from a sensing terminal of each battery cell using a connection hook extending from a case. According to some embodiments, the battery pack may include a plurality of battery cells connected in series with respect to at least one sensing terminal arranged from a first large current terminal to a second large current terminal, a sensing terminal circuit including a sensing tab having a first throughhole formed inward and drawn out from the sensing terminal. a protective circuit module including a connecting tab having a second throughhole corresponding to the first throughhole formed inward and overlapping and electrically connected to the sensing tab. and a battery case for receiving the plurality of battery cells, the sensing terminal circuit and the protective circuit module.

17 Claims, 10 Drawing Sheets

BATTERY PACK

CROSS-REFERENCE TO RELATED APPLICATIONS

This application claims the benefit of Korean Patent Application No. 10-2010-0089411 filed on Sep. 13, 2010, the contents of which are incorporated herein by reference in their entirety.

BACKGROUND

1. Field

The technological field relates to a battery pack and a method of connecting battery cells in a battery pack.

2. Description of the Related Technology

In general, a battery pack is manufactured by packaging multiple battery cells to be used for a portable external electric device such as notebook computers, PDAs (Personal Digital Assistants), camcorders, and the like, due to capacity limitation of a battery cell.

In order to reduce cost, the battery pack has recently employed rechargeable batteries capable of charging and discharging. In the rechargeable battery, individual battery cells may have a different charge/discharge condition. Therefore, the battery pack may be provided with a protective circuit module (PCM), such as a circuit for equalizing the charged states of all battery cells by controlling the charging and discharging operations. The PCM may also be a circuit for preventing over-discharge or over-charge.

SUMMARY OF CERTAIN INVENTIVE ASPECTS

One aspect is a battery pack including a plurality of battery cells connected in series with respect to at least one sensing terminal arranged from a first large current terminal to a second large current terminal. The battery pack further includes a sensing terminal circuit includes a sensing tab having a first throughhole formed inward and drawn out from the sensing terminal. The battery pack further includes a protective circuit module including a connecting tab having a second throughhole corresponding to the first throughhole formed inward, and overlapping and electrically connected to the sensing tab. The battery pack further includes a battery case for receiving the plurality of battery cells, the sensing terminal circuit and the protective circuit module.

Another aspect is a battery pack including a plurality of battery cells connected in series with respect to at least one sensing terminal arranged from a first large current terminal to a second large current terminal. The battery pack further includes a sensing terminal circuit including a sensing tab having a first throughhole formed inward and drawn out from the sensing terminal. The battery pack further includes a protective circuit module including a connecting tab having a second throughhole corresponding to the first throughhole formed inward and overlapping and electrically connected to the sensing tab. The battery pack further includes a battery case for receiving the plurality of battery cells, the sensing terminal circuit and the protective circuit module, wherein the battery case includes a lower connection hook extending from one inner side thereof to then pass through the first and second throughholes, and an upper connection hook extending from the other inner side thereof, opposite to and facing the one inner side, to then pass through the first and second throughholes.

BRIEF DESCRIPTION OF THE DRAWINGS

The aspects, features and advantages of the various embodiments will be more apparent from the following detailed description in conjunction with the accompanying drawings, in which.

DETAILED DESCRIPTION OF CERTAIN INVENTIVE EMBODIMENTS

In the following detailed description, certain exemplary embodiments are shown and described, by way of illustration. As those skilled in the art would recognize, the described exemplary embodiments may be modified in various ways and should not be construed as limiting the invention to the exemplary embodiments set forth herein. Rather, these embodiments are provided so that this disclosure will be thorough and complete.

A configuration of a battery pack according to some embodiments will now be described.

Figure 1:
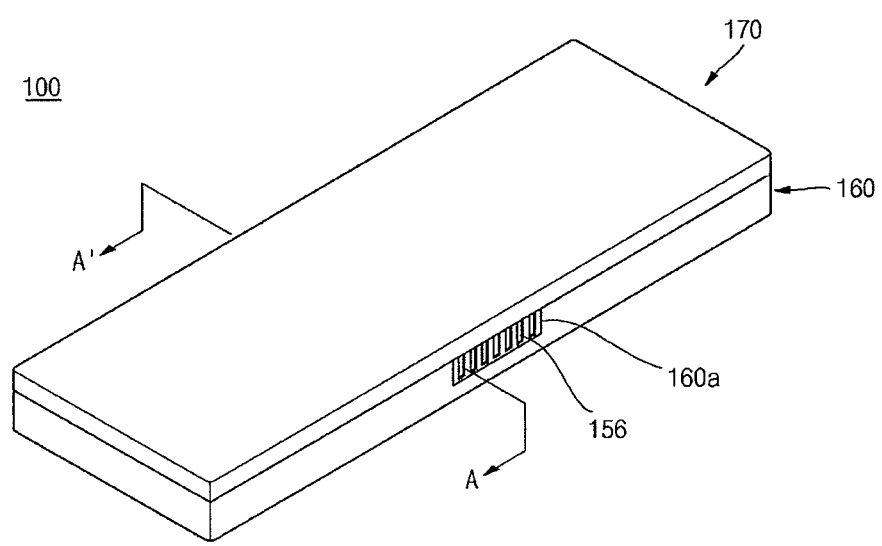
FIG. 1 is a perspective view of a battery pack according to some embodiments of the present invention.
Figure 2:
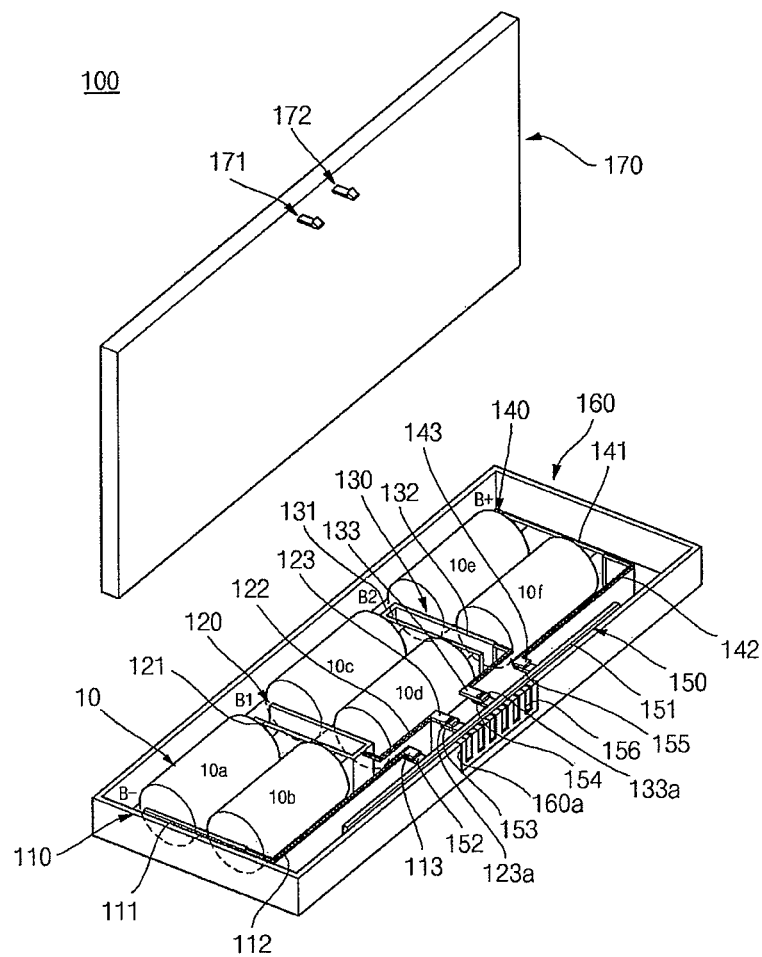
FIG. 2 is an exploded perspective view of the battery pack shown in FIG. 1.
Figure 3A:
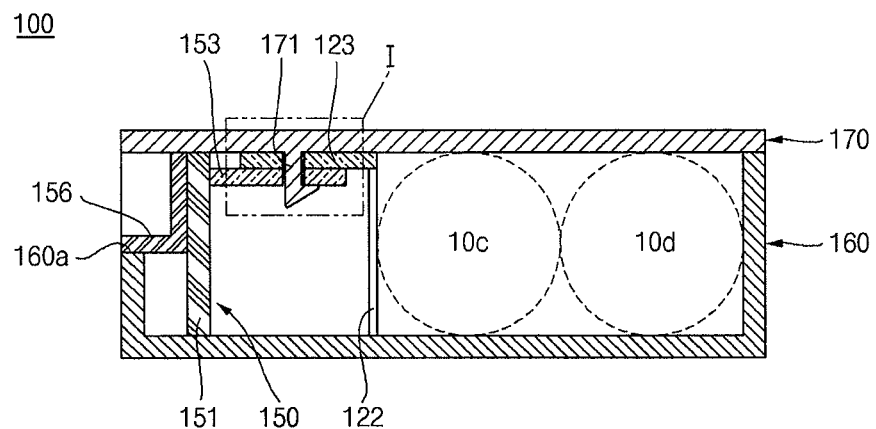
FIG. 3A is a vertical section view taken along the line A-A' of FIG. 1.
Figure 3B:
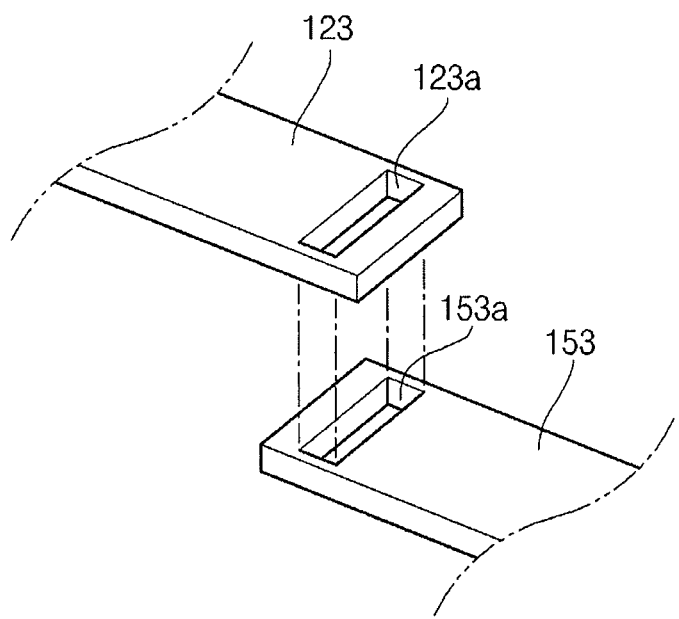
FIG. 3B is an enlarged view illustrating a sensing tab and a connecting tab in the battery pack shown in FIG. 1.
Figure 3C:
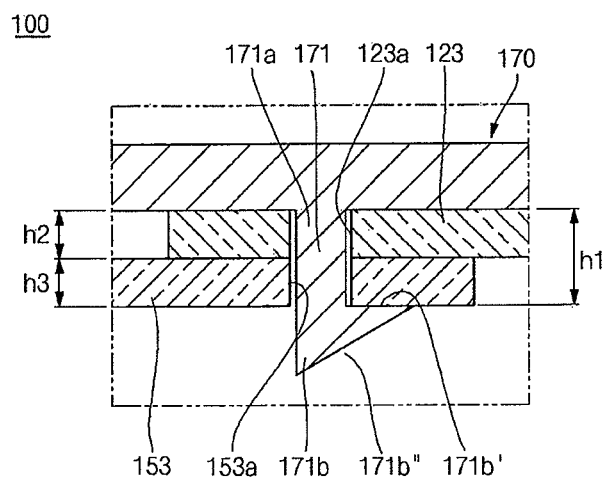
FIG. 3C is an enlarged view of a portion I of FIG. 3B.

FIG. 1 is a perspective view of a battery pack according to some embodiments. FIG. 2 is an exploded perspective view of the battery pack shown in FIG. 1. FIG. 3A is a vertical section view taken along the line A-A' of FIG. 1. FIG. 3B is an enlarged view illustrating a sensing tab and a connecting tab in the battery pack shown in FIG. 1. FIG. 3C is an enlarged view of a portion I of FIG. 3B.

Referring to FIGS. 1 through 3C, the battery pack 100 may include a plurality of battery cells 10, a first large current terminal circuit 110, a first sensing terminal circuit 120, a second sensing terminal circuit 130, a second large current terminal circuit 140, a protective circuit module 150, a lower battery case 160, and an upper battery case 170.

Rechargeable secondary batteries may be used as the battery cells 10. Specifically, cylindrical secondary batteries having a high operating voltage of 3.6V or greater and a high energy density per unit weight may be used as the battery cells 10. Although six battery cells 10 are illustrated in FIG. 2, the number of battery cells used is not limited thereto. The plurality of battery cells 10 may include first to sixth battery cells 10a, 10b, 10c, 10d, 10e, and 10f. Each of the battery cells 10 is designed to have different polarities at top and bottom surfaces thereof. The bottom surface may be electrically connected to a negative electrode of an electrode assembly (not shown) of each of the battery cells 10, and the top surface may be electrically connected to a positive electrode of the electrode assembly.

The plurality of battery cells 10 are connected in series with respect to at least one sensing terminal. The sensing terminals may include a first sensing terminal B1 or a second sensing terminal B2, arranged between a first large current terminal B− and a second large current terminal B+. The first large current terminal B− and the second large current terminal B+ are power sources disposed at opposite ends of each of the battery cells 10, respectively. The first large current terminal B− is a negative electrode power source, that is, a minimum potential terminal, and the second large current terminal B+ is a positive electrode power source, that is, a maximum potential terminal. In addition, the first sensing terminal B1 and the second sensing terminal B2 may be located in portions where battery cells having different polarities are connected in series to each other. For example, the first sensing terminal B1 and the second sensing terminal B2 may be located in an intermediate potential terminal between the first large current terminal B− and the second large current terminal B.

The first large current terminal circuit 110 may include a first lead plate 111, a first conductive tab 112, and a first lead tab 113.

The first lead plate 111 may be electrically connected to negative electrodes. For example, the first lead plate 111 may be connected to the first large current terminal B− of two battery cells 10a and 10b positioned at lower ends, among the battery cells 10.

The first conductive tab 112 may have one end electrically connected to the first lead plate 111 of the first large current terminal B−, and the other end facing one side surface of the lower battery case 160.

The first lead tab 113 may be formed at the other end of a first conductive tab 112. In addition, the first lead tab 113 is electrically connected to the first conductive tab 112. The first lead tab 113 is also electrically connected to a first protective circuit tab 152 of a protective circuit module 150, which will later be described.

The first lead plate 111, the first conductive tab 112 and the first lead tab 113 may be made of a material selected from nickel (Ni), copper (Cu), aluminum (Al) and equivalents thereof. The material, however, is not limited thereto.

The first sensing terminal circuit 120 may include a first sensing plate 121, a first sensing conductive tab 122, and a first sensing tab 123.

The first sensing plate 121 is positioned at the first sensing terminal B1. The first sensing plate 121 may include a bent portion and may be configured such that in view of the bent portion, one side thereof is electrically connected in parallel to two battery cells 10a and 10b among the plurality of battery cells 10, and the other side thereof is electrically connected in parallel to two battery cells 10c and 10d among the plurality of battery cells 10. In addition, the first sensing plate 121 allows the one side battery cells 10a and 10b and the other side battery cells 10c and 10d to be connected in series.

The first sensing conductive tab 122 may be configured such that one end thereof is electrically connected to the first sensing plate 121 of the first sensing terminal B1 and the other end thereof faces the one side surface of the lower battery case 160.

The first sensing tab 123 may be positioned at the other end of the first sensing conductive tab 122. In addition, the first sensing tab 123 is electrically connected to the first sensing conductive tab 122. The first sensing tab 123 is also electrically connected to a first connecting tab 153 of the protective circuit module 150, which will later be described. The first sensing tab 123 includes a first throughhole 123a that may be formed inward. That is, the first throughhole 123a may be formed in the vicinity of a region where the first sensing tab 123 and the first connecting tab 153 overlap each other. The first through-hole 123a passes through the first sensing tab 123 from one side to the other side thereof. A connecting structure of the first sensing tab 123 and the first connecting tab 153 will later be described in detail.

The first sensing plate 121, the first sensing conductive tab 122 and the first sensing tab 123 may be made of a material selected from nickel (Ni), copper (Cu), aluminum (Al) and equivalents thereof. The material, however, is not limited thereto.

The second sensing terminal circuit 130 may include a second sensing plate 131, a second sensing conductive tab 132, and a second sensing tab 133.

The second sensing plate 131 may be positioned at the second sensing terminal B2. The second sensing plate 131 may include a bent portion and may be configured such that in view of the bent portion, one side thereof is electrically connected in parallel to two battery cells 10c and 10d among the plurality of battery cells 10, and the other side thereof is electrically connected in parallel to two battery cells 10e and 10f among the plurality of battery cells 10. In addition, the second sensing plate 131 allows the one side battery cells 10c and 10d and the other side battery cells 10e and 10f to be connected in series.

The second sensing conductive tab 132 may be configured such that one end thereof is electrically connected to the second sensing plate 131 of the second sensing terminal B2 and the other end thereof faces the one side surface of the lower battery case 160.

The second sensing tab 133 may be positioned at the other end of the second sensing conductive tab 132. In addition, the second sensing tab 133 is electrically connected to the second sensing conductive tab 132. The second sensing tab 133 is also electrically connected to a second connecting tab 154 of the protective circuit module 150, which will later be described. In addition, a configuration of the second sensing tab 133 is the same as that of the first sensing tab 133. That is to say, the second sensing tab 133 includes a second throughhole 133a formed in the region where the second sensing tab 133 and the second connecting tab 154 overlap each other.

The second sensing plate 131, the second sensing conductive tab 132 and the second sensing tab 133 may be made of a material selected from nickel (Ni), copper (Cu), aluminum (Al) and equivalents thereof. The material, however, is not limited thereto.

The second large current terminal circuit 140 may include a second lead plate 141, a second conductive tab 142, and a second lead tab 143.

The second lead plate 141 is electrically connected to positive electrodes, that is, the second large current terminal B+, of two battery cells 10e and 10f positioned at upper ends, among the battery cells 10.

The second conductive tab 142 may have one end electrically connected to the second lead plate 141 of the second large current terminal B+, and the other end facing one side surface of the lower battery case 160.

The second lead tab 143 may be formed at the other end of the second conductive tab 142. In addition, the second lead tab 143 is electrically connected to the second conductive tab 142. The second lead tab 143 is also electrically connected to a second protective circuit tab 155 of the protective circuit module 150, which will later be described.

The second lead plate 141, the second conductive tab 142 and the second lead tab 143 may be made of a material selected from nickel (Ni), copper (Cu), aluminum (Al) and equivalents thereof. The material, however, is not limited thereto.

The power of the battery cells 10 may be supplied to a portable electronic device connected to the battery pack 100 through the first large current terminal circuit 110 and the second large current terminal circuit 140.

The protective circuit module 150 may include a protective circuit board 151, a first protective circuit tab 152, a first connecting tab 153, a second connecting tab 154, a second protective circuit tab 155, and a connector 156.

The protective circuit board 151 may be a plate-shaped protective circuit board. The protective circuit board 151 may include a wire pattern (not shown) and multiple electric circuit elements (not shown).

The first protective circuit tab 152 extends from one plane of the protective circuit board 151. In addition, the first protective circuit tab 152 may be made of a conductive material. The first protective circuit tab 152 may be coupled to the first lead tab 113 so as to be electrically connected to each other. For example, the first protective circuit tab 152 and the first lead tab 113 may be coupled to each other by soldering. Since a large current flows through the first protective circuit tab 152 and the first lead tab 113, the first protective circuit tab 152 and the first lead tab 113 need to be coupled to each other with a relatively strong force to reduce a resistance between the first protective circuit tab 152 and the first lead tab 113.

The first connecting tab 153 extends from one plane of the protective circuit board 151. In addition, the first connecting tab 153 may include a second throughhole 153a passing through the first connecting tab 153 from one side to the other side thereof. The second through-hole 153a is formed to have a shape corresponding to that of the first through-hole 123a of the first sensing tab 123. In addition, the first sensing tab 123 and the first connecting tab 153 overlap each other so as to be electrically connected to each other. In particular, the first sensing tab 123 and the first connecting tab 153 may be formed such that the first throughhole 123a and the second throughhole 153a are superimposed. The first through-hole 123a and the second throughhole 153a may be formed to have shapes corresponding to those of a first connection support 171a of the first connection hook 171 to be described later.

The second connecting tab 154 may have the same configuration as the first connecting tab 153. In addition, a coupling relationship between the second connecting tab 154 and the second sensing tab 133 is the same as that between the first connecting tab 153 and the first sensing tab 123. Thus, a detailed description of the second connecting tab 154 will be omitted.

The second protective circuit tab 155 extends from one plane of the protective circuit board 151. In addition, the second protective circuit tab 155 may be made of a conductive material. The second protective circuit tab 155 may be coupled to the second lead tab 143 to then be electrically connected to each other. For example, the second protective circuit tab 155 and the second lead tab 143 may be coupled to each other by soldering. Since a large current flows through the second protective circuit tab 155 and the second lead tab 143, the second protective circuit tab 155 and the second lead tab 143 need to be coupled to each other with a relatively strong force to reduce a resistance between the second protective circuit tab 155 and the second lead tab 143

The connector 156 is formed on the other plane of the protective circuit board 151 to electrically connect the battery pack 100 to a portable electronic device (not shown).

The protective circuit module 150 is electrically connected to the first large current terminal circuit 110 of the first large current terminal B−, the first sensing terminal circuit 120 of the first sensing terminal B1, the second sensing terminal circuit 130 of the second sensing terminal B2, the second large current terminal circuit 140 of the second large current terminal B+ through the first protective circuit tab 152, the first connecting tab 153, the second connecting tab 154 and the second protective circuit tab 155. The protective circuit module 150 thereby controls charging and discharging of the plurality of battery cells 10.

The lower battery case 160 may be shaped of a box having a top opening. A groove 160a through which the connector 156 of the protective circuit module 150 is exposed to the outside may be formed on one side surface of the lower battery case 160. In addition, the lower battery case 160 may accommodate the plurality of battery cells 10, the first large current terminal circuit 110, the first sensing terminal circuit 120, the second sensing terminal circuit 130, the second large current terminal circuit 140, and the protective circuit module 150. The lower battery case 160 may be made of an insulating resin, but is not limited thereto.

The upper battery case 170 may be shaped of a plate to cover the top opening of the lower battery case 160. The upper battery case 170 may be sized to fit the top opening of the lower battery case 160. In addition, the upper battery case 170 may be made of an insulating resin, but is not limited thereto.

As the upper battery case 170 is combined with the lower battery case 160, it is possible to protect the battery cells 10, the first large current terminal circuit 110, the first sensing terminal circuit 120, the second sensing terminal circuit 130, the second large current terminal circuit 140, and the protective circuit module 150 from external surroundings such as impact, dust or the like. In addition, the first connection hook 171 and the second connection hook 172 may extend inside the upper battery case 170.

The first connection hook 171 includes a first connection support 171a and a first connection head 171b.

The first connection support 171a may extend from the inside of the upper battery case 170. In addition, the first connection support 171a is positioned inside the first throughhole 123a of the first sensing tab 123 and the second throughhole 153a of the first connecting tab 153.

The first connection head 171b may include a first flange portion 171b' and a first slant portion 171b". The first flange portion 171b' vertically extends from an end of the first connection support 171a. The first flange portion 171b' is configured such that the first connection hook 171 having passed through the first throughhole 123a and the second throughhole 153a is hook-fixed on the first sensing tab 123 and the first connecting tab 153 overlapping each other. The first slant portion 171b" is inclined such that its vertical sectional width gradually decreases from the first flange portion 171b' to an end of the first connection head 171b. The first slant portion 171b" allows the first connection head 171b to easily pass the first throughhole 123a and the second throughhole 153a.

One of the first connecting tab 153 and the first sensing tab 123 may contact the inside of the lower battery case 160 or the upper battery case 170. That is to say, one side of the first sensing tab 123 may contact the inside of the upper battery case 170 and the other side of the first sensing tab 123 may contact one side of the first connecting tab 153. Although FIGS. 1 through 3C illustrate that the first sensing tab 123 contacts the inside of the upper battery case 170 of the first sensing tab 123, and the first sensing tab 123 is formed on the first connecting tab 153, the aspects of the present invention are not limited thereto. The first connecting tab 153 may contact the inside of the upper battery case 170, and the first sensing tab 123 may be formed under the first connecting tab 153. In addition, a sum of a vertical height h2 of the first sensing tab 123 and a vertical height h3 of the first connecting tab 153 may be equal to a vertical height h1 of the first connection support 171a. Therefore, as shown in FIG. 3C, the first flange portion 171b' of the first connection head 171b contacts the other side of the first connecting tab 153, thereby more securely fixing the first connecting tab 153 with the first sensing tab 123 using the first connection hook 171.

Since a configuration of a second connection hook 172 is the same as that of the first connection hook 171 and a fixing mechanism of the second sensing tab 133 and the second connecting tab 154 using the second connection hook 172 is the same as that of the first sensing tab 123 and the first connecting tab 153 using the first connection hook 171, a detailed description of the second connection hook 172 will be omitted.

Hereinafter, a configuration of a battery pack according to some embodiments will be described.

Figure 4:
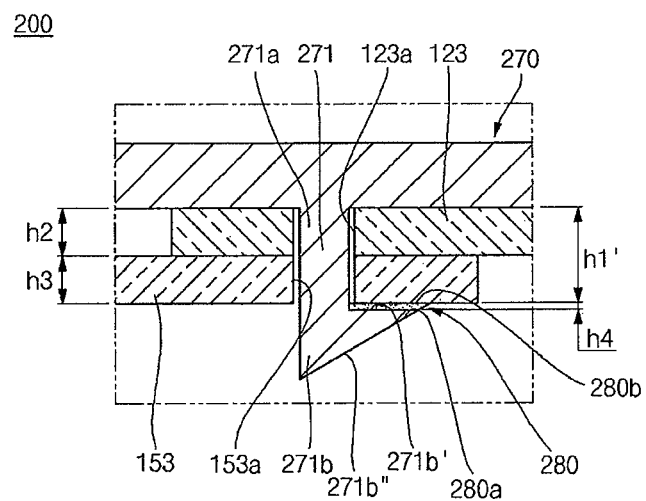
FIG. 4 is an enlarged view corresponding to FIG. 3C in a battery pack according to some embodiments of the present invention.

FIG. 4 is an enlarged view corresponding to FIG. 3C in a battery pack according to some embodiments.

Referring to FIG. 4, the battery pack 200 is different from the battery pack 100 shown in FIGS. 1 through 3C in the configuration of a connection hook. That is, the configuration shown in FIG. 4 may include a first connection hook 271, of an upper battery case 270, and an elastic member 280. Thus, the following description of the battery pack 200 will focus on the first connection hook 271 and the elastic member 280. Functional components of the battery pack 200 which are the same as or similar to those of the battery pack 100 shown in FIGS. 1 through 3C are denoted by the same reference numerals, and a detailed description thereof will be omitted.

The first connection hook 271 includes a first connection support 271a and a first connection head 271b.

The first connection support 271a may extend inside the upper battery case 270. In addition, the first connection support 271a is positioned inside a first throughhole 123a of the first sensing tab 123 and a second throughhole 153a of the first connecting tab 153.

The first connection head 271b may include a first flange portion 271b' and a first slant portion 271b". The first flange portion 271b' vertically extends from an end of the first connection support 271a. The first flange portion 271b' is configured such that the first connection hook 271 having passed through the first throughhole 123a and the second throughhole 153a is hook-fixed on the first sensing tab 123 and the first connecting tab 153 overlapping each other with the elastic member 280. The first slant portion 271b" is inclined such that its vertical sectional width gradually decreases from the first flange portion 271b' to an end of the first connection head 271b. The first slant portion 271b" allows the first connection head 271b to easily pass the first throughhole 123a and the second throughhole 153a.

The elastic member 280 may be formed between the first flange portion 271b' and the first sensing tab 123 and the first connecting tab 153 overlapping each other. In addition, the elastic member 280 may be made of elastic rubber, but the material is not limited thereto.

In addition, a sum of a vertical height h2 of the first sensing tab 123, a vertical height h3 of the first connecting tab 153, and a vertical height h4 of the elastic member 280 may be equal to a vertical height h1 of the first connection support 271a. Therefore, as shown in FIG. 4, one plane 280a of the elastic member 280 contacts the first flange portion 271b' and the other plane 280b of the elastic member 280 contacts the first connecting tab 153, thereby more securely fixing the first connecting tab 153 with the first sensing tab 123 using the first connection hook 271.

Hereinafter, a configuration of a battery pack according to some embodiments will be described.

Figure 5A:
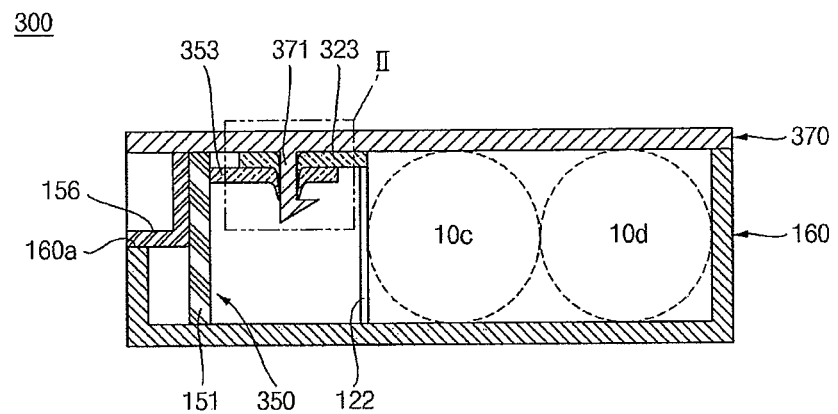
FIG. 5A is a vertical section view taken along the line A-N of FIG. 1.
Figure 5B:
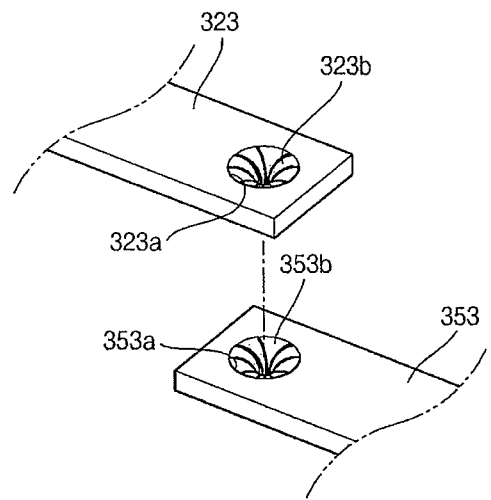
FIG. 5B is an enlarged view illustrating a sensing tab and a connecting tab in the battery pack shown in FIG. 4.
Figure 5C:
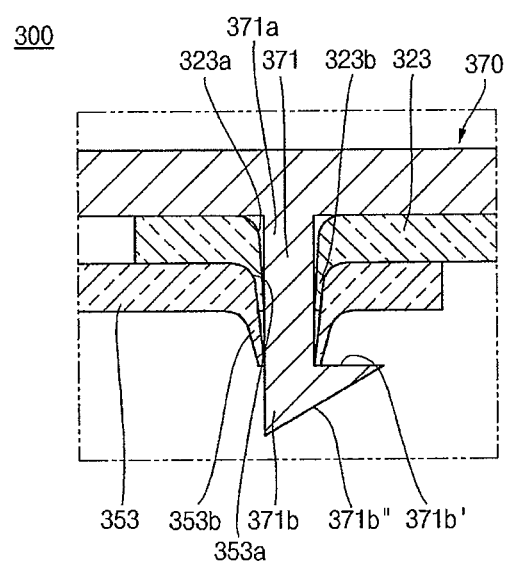
FIG. 5C is an enlarged view of a portion II of FIG. 5B.

FIG. 5A is a vertical section view taken along the line A-A' of FIG. 1. FIG. 5B is an enlarged view illustrating a sensing tab and a connecting tab in the battery pack shown in FIG. 4. FIG. 5C is an enlarged view of a portion II of FIG. 5B.

Referring to FIGS. 5A through 5C, the battery pack 300 according some embodiments is different from the battery pack 100 shown in FIGS. 1 through 3C in the configurations of a first sensing tab 323, a first connecting tab 353 and a connection hook. That is, the configuration of the first connection hook 371, of an upper battery case 370 in connecting the first sensing tab 323, and the first connecting tab 353 will be described. Functional components of the battery pack 300 which are the same as or similar to those of the battery pack 100 shown in FIGS. 1 through 3C are denoted by the same reference numerals, and a detailed description thereof will be omitted.

The first sensing tab 323 is formed at the other end of the first sensing conductive tab 122. In addition, the first sensing tab 323 is electrically connected to a first sensing conductive tab 122. The first sensing tab 323 is also electrically connected to a first connecting tab 353 of a protective circuit module 150, which will later be described. In addition, the first sensing tab 323 may include a first throughhole 323a passing through the first sensing tab 323 from one side to the other side thereof. The first sensing tab 323 includes a first interference fit portion 323b extending from the first throughhole 323a so as to contact a side surface of a first connection support 371a of a first connection hook 371, which will later be described.

The first connecting tab 353 extends from one plane of a protective circuit board 151. In addition, the first connecting tab 353 may include a second through-hole 353a passing through the first connecting tab 353 from one side to the other side thereof. The second through-hole 353a is formed to have a shape corresponding to that of the first throughhole 323a of the first sensing tab 323. In addition, the first sensing tab 323 and the first connecting tab 353 may overlap each other to then be electrically connected to each other. In particular, the first sensing tab 323 and the first connecting tab 353 may be formed such that the first throughhole 323a and the second throughhole 353a are superimposed. The first connecting tab 353 may include a second interference fit portion 353b extending from the second throughhole 353a, so as to contact the side surface of a first connection support 371a and shaped to correspond to the first interference fit portion 323b. Furthermore, since the first interference fit portion 323b is inserted into the second interference fit portion 353b by an interference fit method, the first sensing tab 323 and the first connecting tab 353 are more securely connected to each other.

The first connection hook 371 includes a first connection support 371a and a first connection head 371b.

The first connection support 371a may extend inside the upper battery case 370. In addition, the first connection support 371a is positioned inside the first throughhole 323a of the first sensing tab 323 and the second throughhole 353a of the first connecting tab 353.

A first interference fit portion 323b may be formed to contact a first connection head 371b. The first interference fit portion 323b may be formed such that a portion of the first sensing tab 323 and the first connecting tab 353 overlap one another when a first connection head 371b is inserted in the first throughhole 323a and the second throughhole 353a. The interference between the overlapping portions of the first sensing tab 323 and the first connecting tab 353 allows for a mateable connection between the first sensing tab 323 and the first connection tab 353. The first interference fit portion 323b may be formed such that a portion of a first sensing tab 323 and a portion of a first connecting tab 353 have a tapered shape along the length of the connection support 371a. A portion of a first sensing tab 323 and a first connection tab 353 along the opposite side of a first flange portion 373b' may also be formed to have a tapered shape along the length of the connection support 371a as shown in FIG. 5C.

The first connection head 371b may include a first flange portion 371b' and a first slant portion 371b". The first flange portion 371b' vertically extends from an end of the first connection support 371a. The first flange portion 371b' is configured such that the first connection hook 371 having passed through the first throughhole 323a and the second throughhole 353a is hook-fixed on the first interference fit portion 323b of the first sensing tab 323 and the second throughhole 353a of the first connecting tab 353 overlapping each other. The first flange portion 371b' may be configured to contact both a portion of the first sensing tab 323 and the first connection tab 353. The first slant portion 371b" is inclined such that its vertical sectional width gradually decreases from the first flange portion 3171b' to an end of the first connection head 371b. The first slant portion 371b" allows the first connection head 371b to easily pass the first throughhole 323a and the second throughhole 353a.

Hereinafter, a configuration of a battery pack according to some embodiments will be described.

Figure 6A:
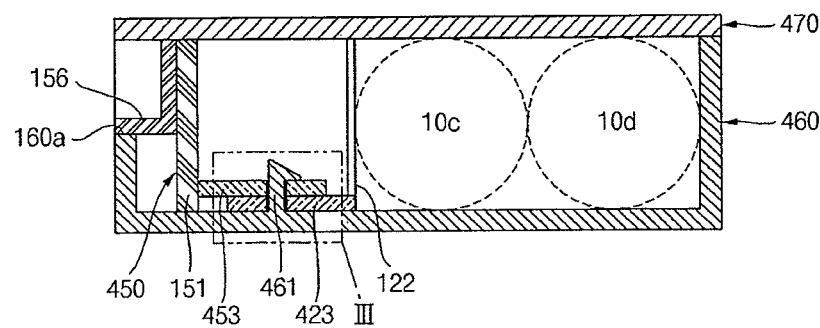
FIG. 6A is a vertical section view of a battery pack according some embodiments of the present invention.
Figure 6B:
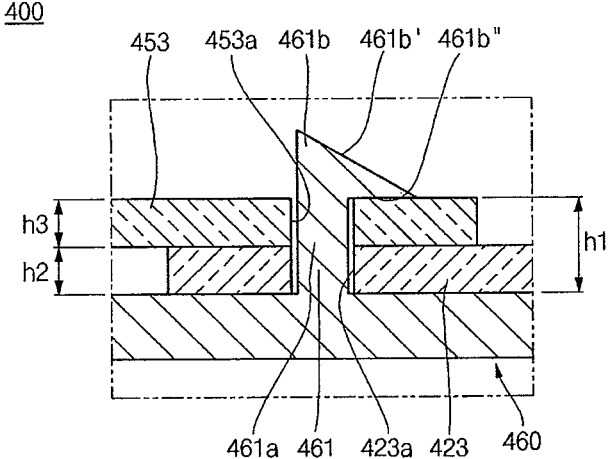
FIG. 6B is an enlarged view of a portion III of FIG. 6A.

FIG. 6A is a vertical section view of a battery pack according to some embodiments. FIG. 6B is an enlarged view of a portion III of FIG. 6A.

Referring to FIGS. 6A and 6B, the battery pack 400 is different from the battery pack 100 shown in FIGS. 1 through 3C in the configuration of a first sensing tab 423, a first connecting tab 453, a lower battery case 460 and an upper battery case 470. Thus, the following description of the battery pack 400 will focus on the first sensing tab 423, the first connecting tab 453, the lower battery case 460 and the upper battery case 470. Functional components of the battery pack 400 which are the same as or similar to those of the battery pack 100 shown in FIGS. 1 through 3C are denoted by the same reference numerals, and a detailed description thereof will be omitted.

The first sensing tab 423 is formed at the other end of the first sensing conductive tab 122. In addition, the first sensing tab 423 is electrically connected to the first sensing conductive tab 122. The first sensing tab 423 is also electrically connected to a first connecting tab 453 of a protective circuit module 450, which will later be described. In addition, the first sensing tab 423 may include a first throughhole 423a formed in the region where the first sensing tab 423 and the first connecting tab 453 overlap each other, the first throughhole 423a passing through the first sensing tab 423 from one side to the other side thereof.

The first connecting tab 453 extends from one plane of a protective circuit board 151. In addition, the first connecting tab 453 may include a second throughhole 453a formed inward, the second throughhole 453a passing through the first connecting tab 453 from one side to the other side thereof. The second throughhole 453a is formed to have a shape corresponding to that of the first throughhole 423a of the first sensing tab 423. In addition, the first sensing tab 423 and the first connecting tab 453 overlap each other to then be electrically connected to each other. In particular, the first sensing tab 423 and the first connecting tab 453 may be formed such that the first throughhole 423a and the second throughhole 453a are superimposed. The first throughhole 423a and the second throughhole 453a may be formed to have shapes corresponding to those of a first connection support 461a of the first connection hook 461.

The first connection hook 461 may extend inside the lower battery case 460. The first connection hook 461 includes a first connection support 461a and a first connection head 461b.

The first connection support 461a may also extend inside the lower battery case 460. In addition, the first connection support 461a is positioned inside the first throughhole 423a of the first sensing tab 423 and the second throughhole 453a of the first connecting tab 453.

The first connection head 461b may include a first flange portion 461b' and a first slant portion 461b". The first flange portion 461b' vertically extends from an end of the first connection support 461a. The first flange portion 461b' is configured such that the first connection hook 461 having passed through the first throughhole 423a and the second throughhole 453a is hook-fixed on the first sensing tab 423 and the first connecting tab 453 overlapping each other. The first slant portion 461b" is inclined such that its vertical sectional width gradually decreases from the first flange portion 461b' to an end of the first connection head 461b. The first slant portion 461b" allows the first connection head 461b to easily pass the first throughhole 423a and the second throughhole 453a.

One of the first connecting tab 453 and the first sensing tab 423 may contact the inside of the lower battery case 460 or the upper battery case 470. That is to say, one side of the first sensing tab 423 may contact the inside of the lower battery case 460 and the other side of the first sensing tab 423 may contact one side of the first connecting tab 453.

Although FIGS. 6A and 6B illustrate that the first sensing tab 423 contacts the inside of the lower battery case 460, and the first connecting tab 453 is formed on the first sensing tab 423, the aspects of the present invention are not limited thereto. The first connecting tab 453 may contact the inside of the lower battery case 460, and the first sensing tab 423 may be formed under the first connecting tab 453.

Additionally, a sum of a vertical height h2 of the first sensing tab 423 and a vertical height h3 of the first connecting tab 453 may be equal to a vertical height h1 of the first connection support 471a. Therefore, as shown in FIG. 6B, the first flange portion 471b' of the first connection head 461b contacts the other side of the first connecting tab 453, thereby more securely fixing the first connecting tab 453 with the first sensing tab 423 using the first connection hook 461.

Hereinafter, a configuration of a battery pack according to some embodiments will be described.

Figure 7:
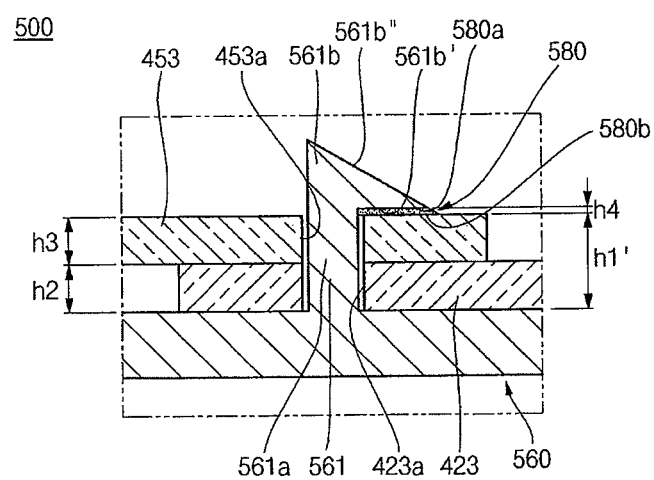
FIG. 7 is an enlarged view corresponding to FIG. 6B in the battery pack shown in FIG. 6A.

FIG. 7 is an enlarged view corresponding to FIG. 6B in the battery pack shown in FIG. 6A. Referring to FIG. 7, the battery pack 500 according to some embodiments is different from the battery pack 400 shown in FIGS. 6A and 6B in the configuration of a connection hook. That is, a connection configuration may include a first connection hook 561, of a lower battery case 560, and an elastic member 580. Thus, the following description of the battery pack 500 will focus on the first connection hook 561 and the elastic member 580. Functional components of the battery pack 500 which are the same as or similar to those of the battery pack 400 shown in FIGS. 6A and 6B are denoted by the same reference numerals, and a detailed description thereof will be omitted.

The first connection hook 561 includes a first connection support 561a and a first connection head 561b.

The first connection support 561a extends from the inside of the lower battery case 560. In addition, the first connection support 561a is positioned inside a first throughhole 423a of a first sensing tab 423 and a second throughhole 453a of a first connecting tab 453.

The first connection head 561b may include a first flange portion 561b' and a first slant portion 561b". The first flange portion 561b' vertically extends from an end of the first connection support 561a. The first flange portion 561b' is configured such that the first connection hook 561 having passed through the first throughhole 423a and the second throughhole 453a is hook-fixed on the first sensing tab 423 and the first connecting tab 453 overlapping each other together with the elastic member 580. The first slant portion 561b" is inclined such that its vertical sectional width gradually decreases from the first flange portion 561b' to an end of the first connection head 561b. The first slant portion 561b" allows the first connection head 561b to easily pass the first throughhole 423a and the second throughhole 453a.

The elastic member 580 may be formed between the first flange portion 561b' and the first sensing tab 423 and the first connecting tab 453 overlapping each other. In addition, the elastic member 580 may be made of elastic rubber, but is not limited thereto.

In addition, a sum of a vertical height h2 of the first sensing tab 423, a vertical height h3 of the first connecting tab 453, and a vertical height h4 of the elastic member 580 may be equal to a vertical height h1' of the first connection support 561a. Accordingly, as shown in FIG. 7, one plane 580a of the elastic member 580 contacts the first flange portion 561b' and the other side 580b of the elastic member 580 contacts the first connecting tab 453, thereby more securely fixing the first connecting tab 453 with the first sensing tab 423 using the first connection hook 561.

Hereinafter, a configuration of a battery pack according to some embodiments will be described.

Figure 8A:
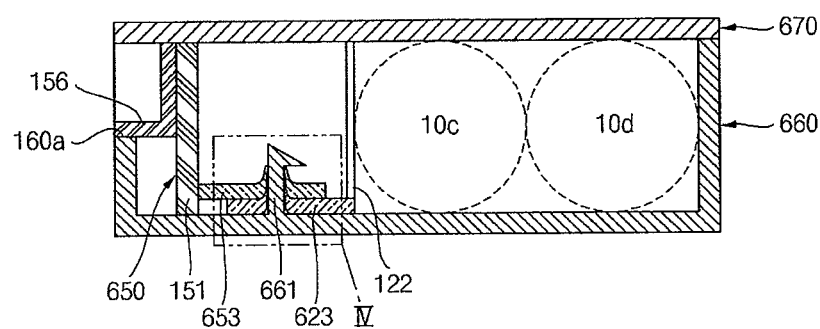
FIG. 8A is a vertical section view of a battery pack according to some embodiments of the present invention.
Figure 8B:
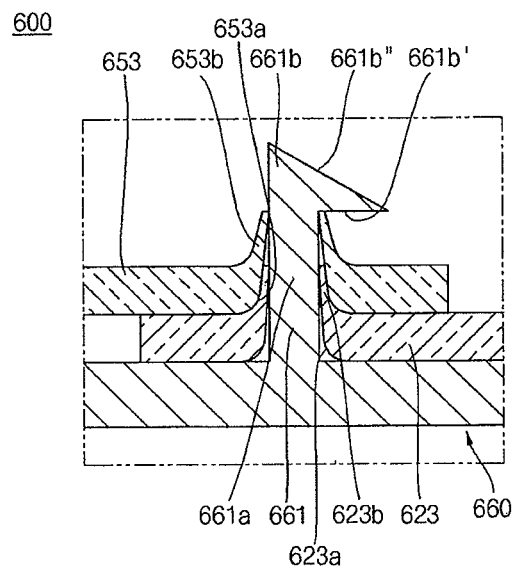
FIG. 8B is an enlarged view of a portion IV of FIG. 8A.

FIG. 8A is a vertical section view of a battery pack according to some embodiments, and FIG. 8B is an enlarged view of a portion IV of FIG. 8A.

Referring to FIGS. 8A and 8B, the battery pack 600 according to some embodiments is different from the battery pack 100 shown in FIGS. 1 through 3C in the configuration of a first sensing tab 623, a first connecting tab 653, and a connection hook 661. That is, a first connection hook 661 may be configured as shown in FIGS. 8A and 8B to connect a lower battery case 660, and an upper battery case 670. Thus, the following description of the battery pack 600 will focus on the first sensing tab 623, the first connecting tab 653 and the first connection hook 661. Functional components of the battery pack 600 which are the same as or similar to those of the battery pack 100 shown in FIGS. 1 through 3C are denoted by the same reference numerals, and a detailed description thereof will be omitted.

The first sensing tab 623 is formed at the other end of a first sensing conductive tab 122. In addition, the first sensing tab 623 is electrically connected to the first sensing conductive tab 122. The first sensing tab 623 is also electrically connected to a first connecting tab 653 of a protective circuit module 650. In addition, the first sensing tab 623 may include a first throughhole 623a formed in the region where the first sensing tab 623 and the first connecting tab 653 overlap each other. The first throughhole 623a passing through the first sensing tab 623 from one side to the other side thereof. The first sensing tab 623 includes a first interference fit portion 623b extending from the first throughhole 623a so as to contact a side surface of a first connection support 661a of a first connection hook 661.

The first connecting tab 653 extends from one plane of a protective circuit board 151. In addition, the first connecting tab 653 may include a second throughhole 653a passing through the first connecting tab 653 from one side to the other side thereof. The second throughhole 653a is formed to have a shape corresponding to that of the first throughhole 623a of the first sensing tab 623. In addition, the first sensing tab 623 and the first connecting tab 653 may overlap each other to then be electrically connected to each other. In particular, the first sensing tab 623 and the first connecting tab 653 may be formed such that the first throughhole 623a and the second throughhole 653a are superimposed. In addition, the first connecting tab 653 may include a second interference fit portion 653b extending from the second throughhole 653a, so as to contact the side surface of a first connection support 661a and shaped to correspond to the first interference fit portion 623b. Further, since the first interference fit portion 623b is inserted into the second interference fit portion 653b by an interference fit method, the first sensing tab 623 and the first connecting tab 653 are more securely connected to each other.

The first connection hook 661 includes a first connection support 661a and a first connection head 661b. The first connection support 661a may extend inside the lower battery case 660. In addition, the first connection support 661a is positioned inside the first throughhole 623a of the first sensing tab 623 and the second throughhole 653a of the first connecting tab 653.

The first connection head 661b may include a first flange portion 661b' and a first slant portion 661b". The first flange portion 661b' vertically extends from an end of the first connection support 661a. The first flange portion 661b' is configured such that the first connection hook 661 having passed through the first throughhole 623a and the second throughhole 653a is hook-fixed on the first interference fit portion 623b of the first sensing tab 623 and the second interference fit portion 653b of the first sensing tab 653 overlapping each other. The first slant portion 661b" is inclined such that its vertical sectional width gradually decreases from the first flange portion 661b' to an end of the first connection head 661b. The first slant portion 661b" allows the first connection head 661b to easily pass the first throughhole 623a and the second throughhole 653a.

Figure 9A:
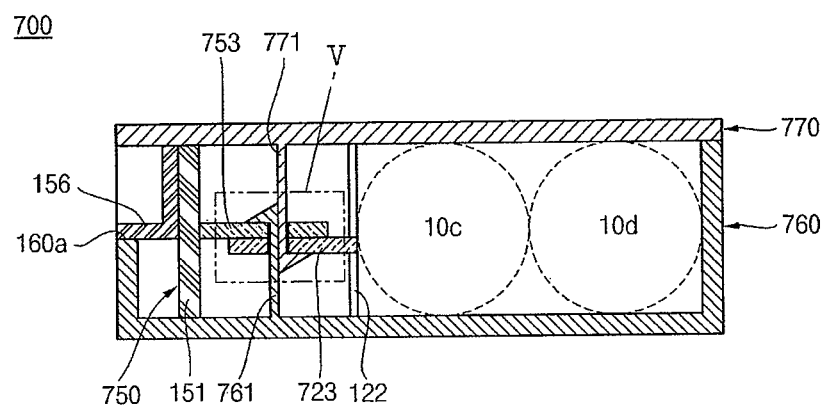
FIG. 9A is a vertical section view of a battery pack according to some embodiments of the present invention.

Hereinafter, a configuration of a battery pack according to still another embodiment of the present invention will be described. FIG. 9A is a vertical section view of a battery pack according to some embodiments, and FIG. 9B is an enlarged view of a portion V of FIG. 9A.

Figure 9B:
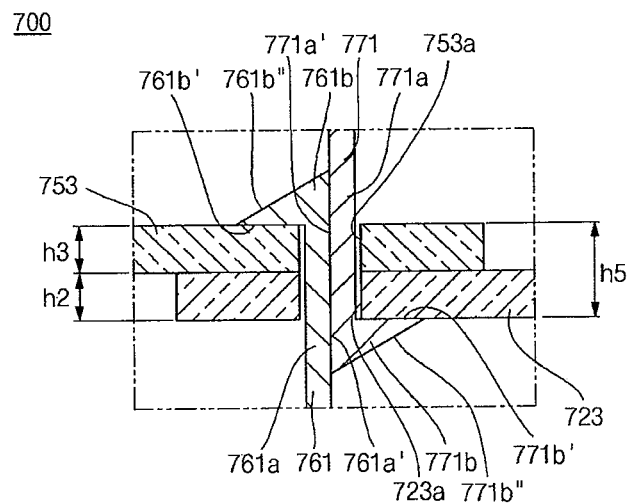
FIG. 9B is an enlarged view of a portion V of FIG. 9A.

Referring to FIGS. 9A and 9B, the battery pack 700 is different from the battery pack 100 shown in FIGS. 1 through 3C in the configuration of a first sensing tab 723, a first connecting tab 753, a lower connection support 761 of a lower battery case 760, and an upper connection support 771 of an upper battery case 770. Thus, the following description of the battery pack 700 will focus on the first sensing tab 723, the first connecting tab 753, the lower connection support 761, and the upper connection support 771. Functional components of the battery pack 700 which are the same as or similar to those of the battery pack 100 shown in FIGS. 1 through 3C are denoted by the same reference numerals, and a detailed description thereof will be omitted.

The first sensing tab 723 is formed at the other end of a first sensing conductive tab 122. In addition, the first lead tab 723 is electrically connected to first sensing conductive tab 122.

The first lead tab 723 is also electrically connected to a first connecting tab 753 of a protective circuit module 750. In addition, the first sensing tab 723 includes a first throughhole 723a formed in the region where the first sensing tab 723 and the first connecting tab 753 overlap each other, the first throughhole 723a passing through the first sensing tab 723 from one side to the other side thereof.

The first connecting tab 753 extends from one plane of a protective circuit board 151. In addition, the first connecting tab 753 may include a second throughhole 753a passing through the first connecting tab 753 from one side to the other side thereof. The second throughhole 753a is formed to have a shape corresponding to that of the first throughhole 723a of the first sensing tab 723. In addition, the first sensing tab 723 and the first connecting tab 753 may overlap each other to then be electrically connected to each other. In particular, the first sensing tab 723 and the first connecting tab 753 may be formed such that the first throughhole 723a and the second throughhole 753a are superimposed. A first connection support 761a of a lower connection hook 761 and a second connection support 771a of an upper connection hook 771 are positioned inside the first throughhole 723a and the second throughhole 753a.

The lower connection hook 761 may extend inside the lower battery case 760. The lower connection hook 761 includes a first connection support 761a and a first connection head 761b.

The first connection support 761a may extend inside the lower battery case 760. In addition, the first connection support 761a is positioned inside the first throughhole 723a of the first sensing tab 723 and the second throughhole 753a of the first connecting tab 753.

The first connection head 761b may include a first flange portion 761b' and a first slant portion 761b". The first flange portion 761b' vertically extends from an end of the first connection support 761a. The first flange portion 761b' is configured such that the first connection hook 761 having passed through the first throughhole 723a and the second throughhole 753a is hook-fixed on the first sensing tab 723 and the first sensing tab 753 overlapping each other. The first slant portion 761b" is inclined such that its vertical sectional width gradually decreases from the first flange portion 761b' to an end of the first connection head 761b. The first slant portion 761b" allows the first connection head 761b to easily pass the first throughhole 723a and the second throughhole 753a.

The upper connection hook 771 includes a second connection support 771a and a second connection head 771b. The second connection support 771a may extend inside the upper battery case 770. In addition, the second connection support 771a is positioned inside the first throughhole 723a of the first sensing tab 723 and the second throughhole 753a of the first connecting tab 753.

The second connection head 771b may include a second flange portion 771b' and a second slant portion 771b". The second flange portion 771b' vertically extends from an end of the second connection support 771a in a direction opposite to a direction in which the second flange portion 771b' of the lower connection hook 771 extends. The second flange portion 771b' is configured such that the upper connection hook 771 having passed through the first throughhole 723a and the second throughhole 753a is hook-fixed on the first sensing tab 723 and the first connecting tab 753 overlapping each other. The second slant portion 771b" is inclined such that its vertical sectional width gradually decreases from the first flange portion 771b' to an end of the first connection head 771b. The second slant portion 771b" allows the second connection head 771b to easily pass the first throughhole 723a and the second throughhole 753a.

In addition, a sum of a vertical height h2 of the first sensing tab 723 and a vertical height h3 of the first connecting tab 753 may be equal to a vertical height h5 ranging from the first flange portion 761b' to the second flange portion 771b'. Accordingly, one side of the first connecting tab 753 contacts the first flange portion 761b' and the other side of the first connecting tab 753 contacts one side of the first sensing tab 723, and the other side of the first sensing tab 723 contacts the second flange portion 771b', thereby more securely fixing the first connecting tab 753 with the first sensing tab 723 using the lower connection hook 761 and the upper connection hook 771.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A battery pack comprising:
   a plurality of battery cells connected in series with respect to at least one sensing terminal arranged from a first large current terminal to a second large current terminal;
   a sensing terminal circuit including a sensing tab having a first throughhole formed inward and drawn out from the sensing terminal;
   a protective circuit module including a connecting tab having a second throughhole corresponding to the first throughhole formed inward, and overlapping and electrically connected to the sensing tab, wherein the first throughhole passes through the sensing tab from one side to the other side thereof, and the second throughhole passes through the connecting tab from one side to the other side thereof;
   a battery case for receiving the plurality of battery cells, the sensing terminal circuit and the protective circuit module, wherein the battery case comprises a connection hook extending from one inner side thereof to then pass through the first and second throughholes and fixing the sensing tab and the connecting tab; and
   wherein the connection hook comprises a connection support extending from the one inner side of the battery case and positioned inside the first throughhole and the second throughhole, and a connection head having a flange portion vertically extending from the connection support and a slant portion tapering from the flange portion to its end.

2. The battery pack of claim 1, wherein one of the connecting tab and the sensing tab is configured to contact the inside of the battery case.

3. The battery pack of claim 1, wherein an elastic member is further provided between the flange portion of the connection hook and the sensing tab, and wherein the sensing tab and the connecting tab overlap each other.

4. The battery pack of claim 1, wherein the battery case comprises:
   a lower battery case having a top opening, wherein the battery case is configured to house the plurality of battery cells, the sensing terminal circuit and the protective circuit module; and
   an upper battery case covering the top opening of the lower battery case.

5. The battery pack of claim 4, wherein the connection hook is configured to extend from one inner side of the lower battery case.

6. The battery pack of claim 4, wherein the connection hook is configured to extend from one inner side of the upper battery case.

7. The battery pack of claim 1, further comprising:
a first interference fit portion extending from the first throughhole and contacting a side surface of the connection hook; and
a second interference fit portion extending from the second throughhole and contacting a side surface of the connection hook, wherein the second interference fit portion is shaped to correspond to the first interference fit portion, and wherein the first interference fit portion and the second interference fit portion are interference fit coupled to each other.

8. The battery pack of claim 1, further comprising:
a first large current terminal circuit drawn out from the first large current terminal at one side thereof and a first lead tab provided at the other side thereof; and
a second large current terminal circuit drawn out from the second large current terminal at one side thereof and a second lead tab provided at the other side thereof, wherein the protective circuit module further comprises a first protective circuit tab electrically connected to the first lead tab and a second protective circuit tab electrically connected to the second lead tab.

9. The battery pack of claim 8, wherein the first lead tab and the first protective circuit tab are soldered to each other, and the second lead tab and the second protective circuit tab are soldered to each other.

10. A battery pack comprising:
a plurality of battery cells connected in series with respect to at least one sensing terminal arranged from a first large current terminal to a second large current terminal;
a sensing terminal circuit including a sensing tab having a first throughhole formed inward and drawn out from the sensing terminal;
a protective circuit module including a connecting tab having a second throughhole corresponding to the first throughhole formed inward and overlapping and electrically connected to the sensing tab; and
a battery case for receiving the plurality of battery cells, the sensing terminal circuit and the protective circuit module, wherein the battery case comprises a lower connection hook extending from one inner side thereof to then pass through the first and second throughholes, and an upper connection hook extending from the other inner side thereof, opposite to and facing the one inner side, to then pass through the first and second throughholes.

11. The battery pack of claim 10, wherein the first throughhole passes through the sensing tab from one side to the other side thereof, and the second throughhole passes through the connecting tab from one side to the other side thereof.

12. The battery pack of claim 10, wherein the lower connection hook includes a first connection support extending from the one inner side of the battery case and positioned inside the first throughhole and the second throughhole, and a first connection head having a first flange portion vertically extending from the first connection support and a first slant portion tapering from the first flange portion to its end.

13. The battery pack of claim 12, wherein the upper connection hook further comprises a second connection support extending from the other inside of the battery case and positioned inside the second throughhole and the second throughhole, and a second connection head having a second flange portion vertically extending from the second connection support in a direction opposite to a direction in which the first flange portion extends, and a second slant portion tapering from the second flange portion to its end.

14. The battery pack of claim 12, wherein the battery case further comprises a lower battery case having a top opening and housing the plurality of battery cells, the sensing terminal circuit and the protective circuit module, and an upper battery case covering the top opening of the lower battery case.

15. The battery pack of claim 14, wherein the lower connection hook extends from the lower battery case, and the upper connection hook extends from the upper battery case.

16. The battery pack of claim 12, further comprising:
a first large current terminal circuit drawn out from the first large current terminal at one side thereof and a first lead tab provided at the other side thereof; and
a second large current terminal circuit drawn out from the second large current terminal at one side thereof and a second lead tab provided at the other side thereof, wherein the protective circuit module further comprises a first protective circuit tab electrically connected to the first lead tab and a second protective circuit tab electrically connected to the second lead tab.

17. The battery pack of claim 16, wherein the first lead tab and the first protective circuit tab are soldered to each other, and the second lead tab and the second protective circuit tab are soldered to each other.

* * * * *